US 6,494,026 B1

(12) United States Patent
Schmidt

(10) Patent No.: US 6,494,026 B1
(45) Date of Patent: Dec. 17, 2002

(54) VERTICAL BELT DRIVE FOR ARTICULATING MOWER DECK

(75) Inventor: Michael Todd Schmidt, Holly Springs, NC (US)

(73) Assignee: Deere & Company, Moline, IL (US)

( * ) Notice: Subject to any disclaimer, the term of this patent is extended or adjusted under 35 U.S.C. 154(b) by 15 days.

(21) Appl. No.: 09/819,314

(22) Filed: Mar. 28, 2001

(51) Int. Cl.$^7$ .................. A01D 34/24; A01D 34/42; A01D 34/63
(52) U.S. Cl. ........................... 56/15.2; 56/14.9
(58) Field of Search ............... 56/255, 6, 13.5, 56/15.9, 15.2, 14.9, 16.2, 14.7, DIG. 10

(56) References Cited

U.S. PATENT DOCUMENTS

| | | | |
|---|---|---|---|
| 3,208,207 A | | 8/1965 | Bottenberg |
| 3,500,619 A | * | 3/1970 | Bacon ............................ 56/6 |
| 3,543,490 A | * | 12/1970 | Erickson ..................... 56/13.7 |
| 3,608,284 A | | 9/1971 | Erdman ........................... 56/6 |
| 4,429,515 A | * | 2/1984 | Davis, Jr. et al. .............. 56/6 |
| 4,497,160 A | | 2/1985 | Mullet et al. .................... 56/6 |
| 4,972,664 A | * | 11/1990 | Frey .......................... 56/13.6 |
| 5,109,655 A | | 5/1992 | Tekulve ........................... 56/6 |
| 5,177,942 A | | 1/1993 | Hager et al. ................. 56/11.6 |
| 5,197,267 A | | 3/1993 | Aldred et al. ................. 56/249 |
| 5,228,277 A | | 7/1993 | Smith et al. .................. 56/16.9 |
| 5,233,817 A | * | 8/1993 | Nicol .............................. 56/6 |
| 5,249,411 A | | 10/1993 | Hake ........................... 56/11.6 |
| 5,343,683 A | | 9/1994 | Friesen ...................... 56/320.1 |
| 5,361,566 A | | 11/1994 | Hohnl ......................... 56/11.6 |
| 5,771,669 A | | 6/1998 | Langworthy et al. ............. 56/6 |
| 5,813,202 A | | 9/1998 | Goman et al. ............... 56/15.2 |

FOREIGN PATENT DOCUMENTS

| | | |
|---|---|---|
| DE | 19 16 430 A | 11/1969 |
| DE | 34 23 410 A | 1/1985 |
| NL | 7 316 392 A | 2/1974 |

OTHER PUBLICATIONS

LasTec, "Professional Golf & Turf Equipment", date and place of publication unknown.
Copies of eight (8) pages of photographs of commercially available equipment, photographs taken by a Deere and Company employee in U.S.A. in approximately Aug. 2000.
The Toro Company, "Groundsmaster 300 Series With Contour 72 Deck", provided pages, published in 1999 in U.S.A.
The Toro Company, "Groundsmaster 3000–D", provided pages, published in 2000 in U.S.A.
The Toro Company, "72 Flexdeck For Groundsmaster 300 Series", provided pages, published in 2000 in U.S.A.
Wood Brothers Mfg. Co., "Wood's batwing 180", pp. 1–2, published at least as early as Apr. 1970 in U.S.A.
Engler Manufacturing Corporation, "A New Measure of Greatness", p. 1, published at least as early as Mar. 1967 in U.S.A.
LasTec, "The Articulator, Model 425D", pp. 1–2, published at least as early as Jul. 1998 in U.S.A.

* cited by examiner

Primary Examiner—Robert E. Pezzuto
Assistant Examiner—Árpád Fábián Kovács

(57) ABSTRACT

A belt drive arrangement for a cutting implement having multiple pivotally connected decks. The arrangement consists of pulley carrying arms, whereby each of the arms carries a plurality of drive and driven pulleys having respective belts thereon for the transfer of power to the blades carried within each of the decks. Each arm has an end mounted with the deck whereby the arrangement is pivotal to permit the axes about which each of the pulleys rotate to remain substantially parallel to each other as a particular deck flexes relative to an adjacent deck. The belts then generally maintain alignment with the grooves of the pulleys. Consequently, the belts are less stressed as they rotate since they do not have to twist and/or bend when entering or exiting the pulleys.

10 Claims, 9 Drawing Sheets

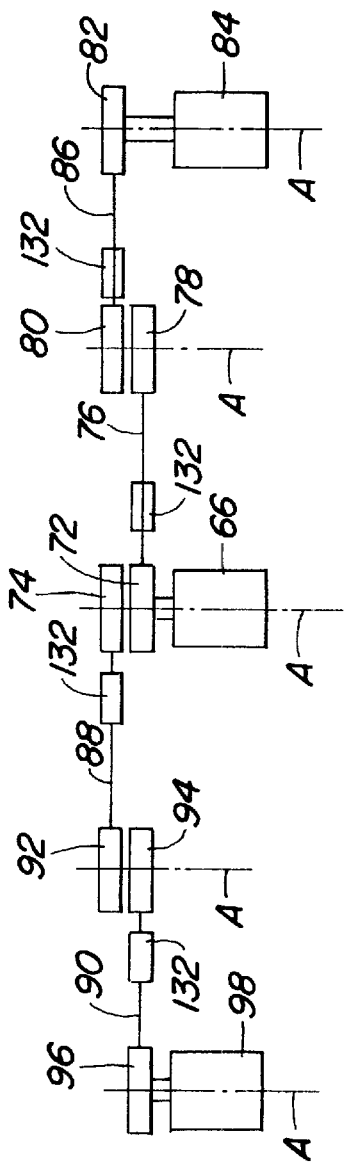
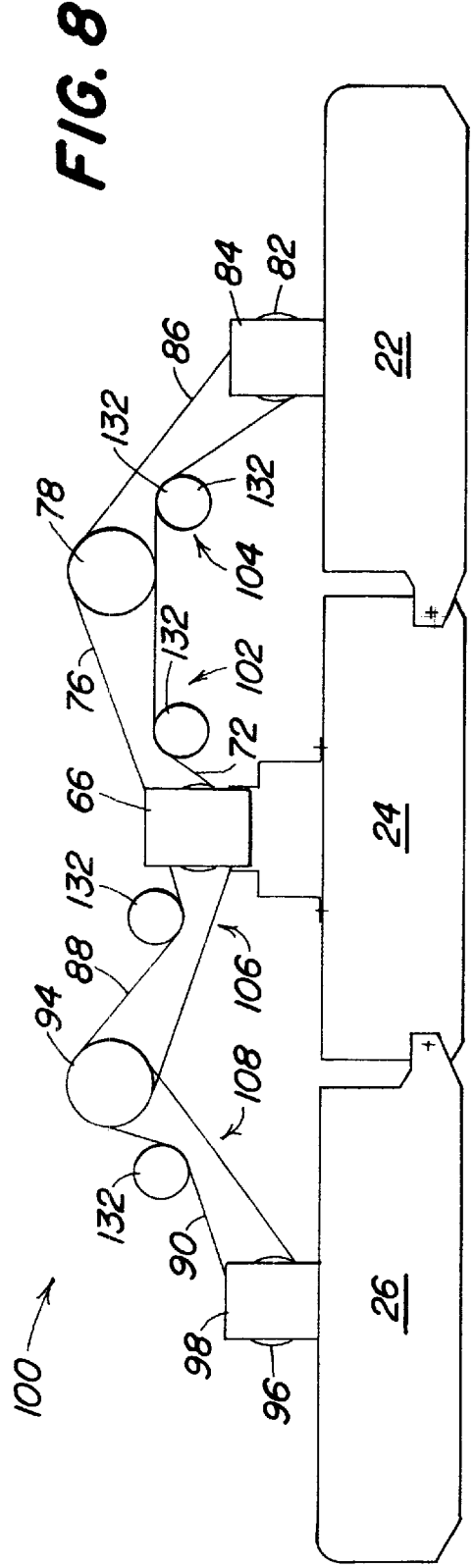
FIG. 8a
FIG. 8

VERTICAL BELT DRIVE FOR ARTICULATING MOWER DECK

BACKGROUND OF THE INVENTION

1. Field of the Invention

This invention relates to mower cutting implements having multiple cutting spindles and decks and more specifically to a spindle belt drive configuration that allows the decks to flex relative to each other without stressing the respective belts of the drive.

2. Description of Related Art

Mower cutting implements having multiple cutting blades ordinarily have separate decks or housings which enclose those blades. These decks are often hingedly connected together to allow each of the decks to flex or pivot independently and relative to another as the deck moves across the ground. Many times, mowers having this hinged connection between the decks are used in the care of grounds having a substantially uneven surface or contour. Accordingly, flexing between each of the decks permits grounds of this type to be uniformly maintained as each deck is able to follow the contour at a pre-set level of cut.

It is known that a common way to power the blades within the decks is to use a belt drive system utilizing pulleys and belts extending between the decks. Power for the decks is provided by a drive shaft connected with a mower's power take off. The drive shaft transmits power to a central or main gear box on the central cutting deck. This gear box in turn rotates a main drive pulley and drives the center blade of the main or central deck. Power from this main drive pulley is transferred by endless belts to one or more other driven pulleys which drive blades housed within the adjacent decks.

Past designs have oriented these pulleys and belts to rotate within a plane generally parallel to the surface of the decks. Since each pulley rotates about its own vertically extending axis, the axes of the drive and driven pulleys are substantially parallel when the decks are operating on a generally level surface. As the decks move across uneven ground however, they will pivot and the axes of rotation of these pulleys no longer remain parallel to one other.

As the axes of the drive and driven pulleys become non-parallel, the belts entrained about them have often not been able to enter and exit the pulley grooves without being misaligned to some degree. Because of the misalignment, a number of disadvantages exist with respect to the pulleys and belts which rotate thereon. First, the belts wear easily and become frayed or torn as each deck pivots relative to the remainder of the deck. Wearing of this type occurs since the belts repeatedly twist and bend as they enter and exit the V-shaped flanges of the pulleys as the respective decks pivot. This causes stresses to be encountered by the belts resulting in their accelerated wear and eventual tearing since the belts are in motion when pivoting of the decks takes place. Accordingly, increased maintenance in terms of repair and/or replacement of the belts may occur more often than is necessary.

Second, the pulleys themselves and specifically their inner flanges may deform over time as the belts bear against the flanges when pivoting of the decks occurs. Third, the belts frequently become stretched or lengthened as a particular cutting deck repeatedly pivots upwardly and downwardly to accommodate the contour of the ground surface. This repeated vertical motioning of the belts stretches them. Consequently, the belts sometimes slip when entering the pulleys, thereby affecting operation of the cutting blades and therefore, the effectiveness of the overall cutting performance.

Thus, it would be beneficial to provide a configuration for a belt drive system that orients the pulleys to allow the belts to enter and exit the pulleys without twisting and without constriction as any one deck flexes or pivots with respect to the adjacent decks.

SUMMARY OF THE INVENTION

Accordingly, there is provided a belt drive system for a cutting implement having one or more pivotally connected decks. The belts transfer power between a drive pulley mounted with a first deck to a driven pulley mounted with a second and adjacent deck to rotate the blades housed within the decks. Third and fourth pulleys are provided to transfer power between the drive and driven pulleys. The third and fourth pulleys are fixed for rotation together and remain substantially above the pivotal connection of the decks, rotating about an axis that remains generally parallel to the rotational axes of the drive and driven pulleys as the decks pivot. Parallel alignment of these axes enables the belts entrained about the pulleys to enter and exit smoothly without twisting or being otherwise stressed.

To permit parallel alignment of the axes of rotation of the pulleys as the decks pivot and thereby enable the belts to move between the pulleys without having to twist, the pulleys are mounted with pivot arms that move the pulleys and the belts in reaction to movement of the decks. Movement of the belts into and out of the pulleys without their twisting occurs since the grooves thereof remain aligned as the deck pivots.

Alignment of the pulleys and their grooves is maintained throughout pivoting of the decks because the arms vertically reposition the pulleys in response to the deck pivoting. Vertical movement of the arms allows each pulley to be coaxial with its respective adjacent pulley so as to align the grooves of those pulleys and thereby avoid twisting and/or bending of the belts entrained thereabout when entering or exiting the pulleys.

Additionally, since the pulleys are moved relative to one another, they and their flanges are not stressed or otherwise deformed by the entry and exit of the belts since the grooves in which the belts move are always in substantial alignment. Consequently, the belts and associated pulleys on which they rotate will experience a longer operating life thereby reducing the need for frequent repair and/or replacement.

There is further provided a belt drive system that substantially retains the original length of the belts entrained about the pulleys as the decks repeatedly pivot upwardly and downwardly. Maintenance of this original length is accomplished through constructing the above pivot arms with two angular and fixed length sections or members connected together. Restricting each of these sections to a fixed length keeps the center distance between adjacent pulleys, i.e., the distance between the center point of one pulley and its adjacent pulley, constant at all times. Therefore, the likelihood of stretching the belts as the decks pivot is substantially reduced.

Thus, there is provided a belt drive system for a cutting implement having pivotally connected decks whereby the system enables the belts to travel smoothly into and out of the pulleys about which they are entrained as the decks pivot. Further, there is provided a system which substantially maintains the original length of the belts and also reduces the likelihood of deformation of the pulleys as the decks pivot.

BRIEF DESCRIPTION OF THE DRAWINGS

FIG. 8 is a schematic front view of the belt drive and support arrangement illustrated in FIG. 4.

FIG. 8a is a schematic plan view of the invention according to FIG. 8.

DESCRIPTION OF THE PREFERRED EMBODIMENT

Figure 1:
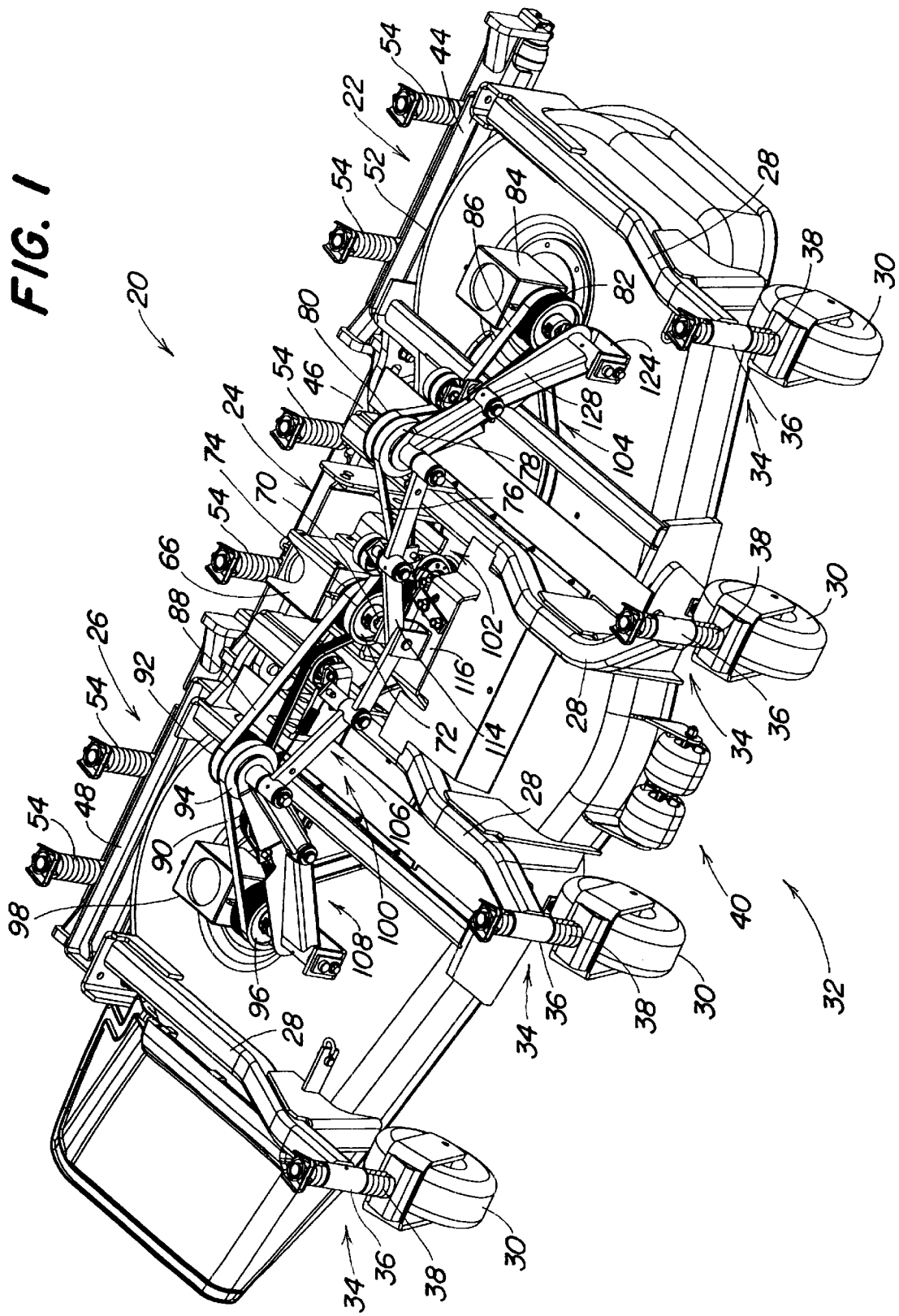
FIG. 1 is a front and side elevation view of a mower cutting implement including a belt drive and is support arrangement of the present invention.

Looking to FIG. 1, there is provided a cutting implement 20 for a mower (not shown) having a first deck 22, a second deck 24 and third deck 26. The first and third decks 22, 26 are pivotally mounted to the second deck 24 to permit the first and third deck to pivot and thus follow the contour of an uneven ground surface. Also in FIG. 1, there is shown a plurality of wheel supports 28 mounted with the top surface of the implement 20. Each support 28 has a ground engaging guide wheel 30 connected therewith for supporting and guiding the front 32 of the implement 20 across the ground. Connected between each support 28 and the wheel 30 is a height adjustment device 34 taking the form of a post 36 including removable rings 38 for allowing the operator to select a height of cut. Further attached with the front 32 of the implement 20 are a pair of anti-scalp wheels 40 provided for their conventional use.

Figure 2:
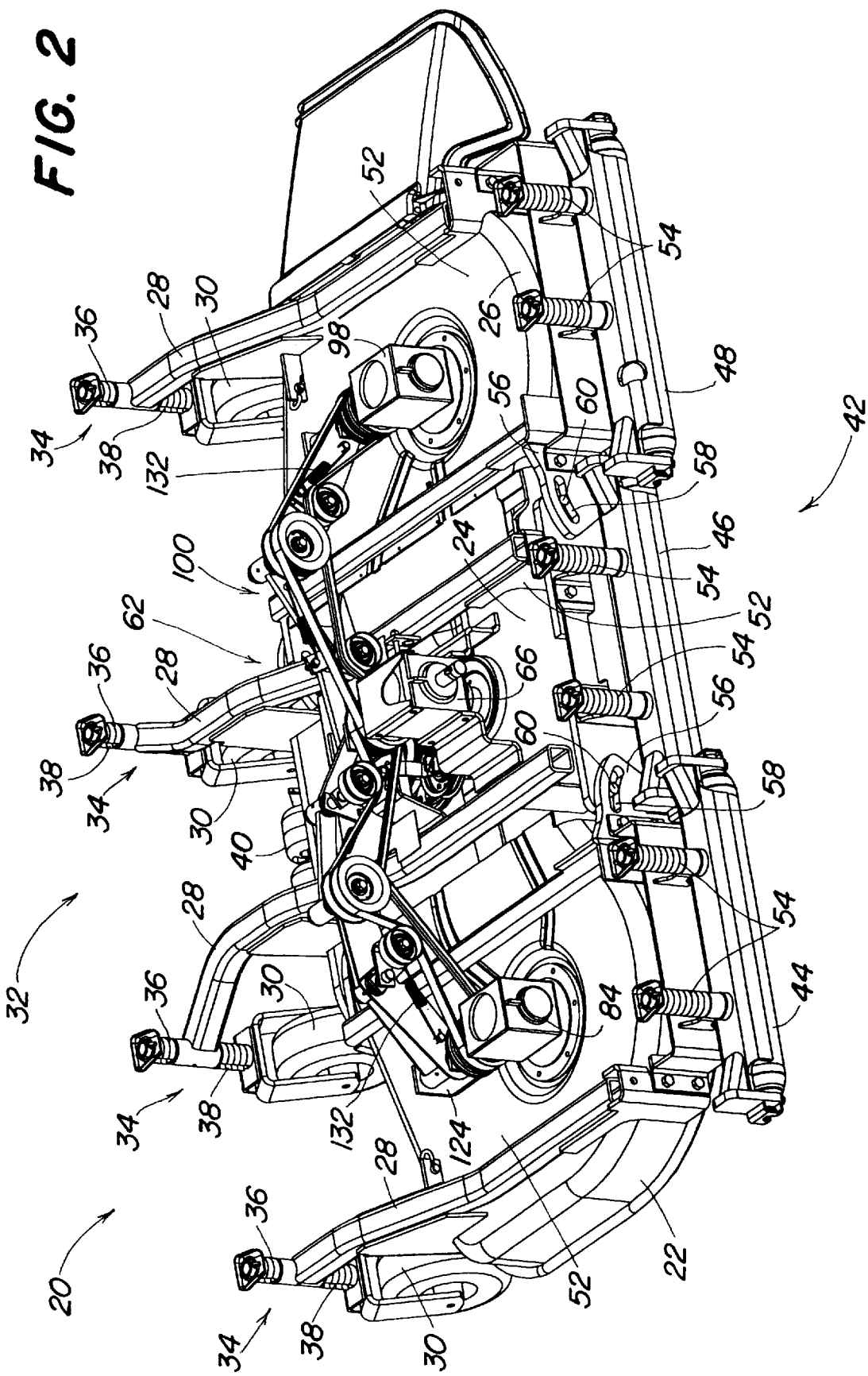
FIG. 2 is a rear and side elevated perspective view of the implement of FIG. 1.

As shown in FIG. 2, the rear 42 of the implement 20 has attached thereto first, second and third roller or roller assemblies 44, 46 and 48, respectively. Each assembly is pivotally mounted with its adjacent assembly and is connected with the first, second and third decks 22, 24, 26 respectively, for supporting the rear 42 of the implement 20 at a desired height as it traverses the ground. On a top surface of each of the assemblies 44, 46 and 48, a pair of height adjustment means 54, constructed similarly to the devices in appearance and function, are attached thereto for leveling the rear 42 of the implement to generally the same height of cut set at the front 32 thereof.

Figure 3:
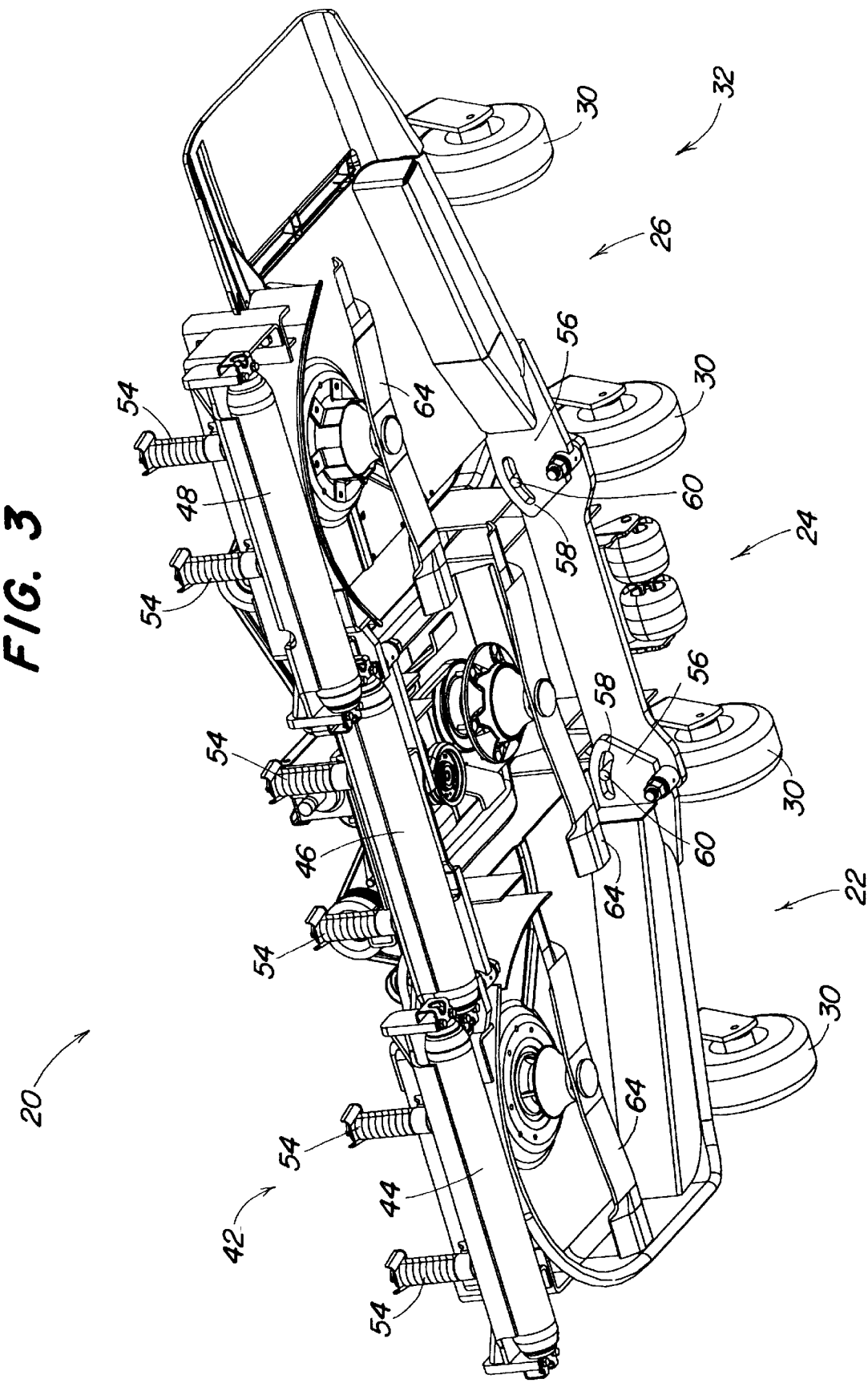
FIG. 3 is a rear elevated perspective view of the underside of the implement according to FIG. 1.

As is shown in FIGS. 2 and 3, a pivot plate 56 is connected, preferably by weldment, with each of the first and third decks 22 and 26 at both the front 32 and rear 42 of the implement 20. The plate 56 contains an arcuately shaped slot 58 therein. A pair of pins 60 are rigidly mounted on each side of second or central deck 24 to matingly engage the slots 58 of the first and third decks 22 and 26 to move therein and define the amount of movement of the first and third decks 22 and 26 relative to the second deck 24. The amount of pivoting or flexing of the side decks 22 and 26 relative to the center deck is defined by limiting movement of the pin 60 within the slot between preferably, the range of substantially 0 and plus or minus 20 degrees.

As best seen in FIGS. 1–2, a belt drive 62 for transferring power from the mower's power take-off (PTO) (not shown) to the blades 64, see FIG. 3, carried within each of the decks 22, 24 and 26 is provided relative to the top surface of each of the decks. Power is delivered by the PTO through its connection with a central or main gear box 66 attached to the second deck 24 as is best shown in FIG. 2. The gear box 66 is, in turn, connected with a vertical shaft (not shown) that drives a double pulley arrangement 68, see FIG. 4, for turning the blade 64 housed within the second deck 24. Looking again to FIG. 1, on an opposite side of the gear box 66, a further shaft 70 is provided to mount a first drive pulley 72 that separately moves a first belt 76 attached thereto to transfer power from the PTO to a third pulley 78 which rotates a fourth pulley 80 rigidly connected therewith. The fourth pulley 80 is driven by rotation of the third pulley 78 to transfer power to the blade 64 of the first deck 22 via the first belt 76 entrained about the first drive pulley 72 and the third pulley 78 as shown specifically in FIGS. 4 and 8a. From this fourth pulley 80, power is then transferred to a second pulley 82 attached to and driving a second gear box 84, shown in FIG. 1 and 8a, and which is mounted with the first or left deck 22 and is used to turn the blade of the deck 22 via a second belt 86 entrained about the fourth and second pulleys 80, 82. Power is supplied to the blade 64 of the third deck 26 through a similarly constructed portion of the drive 62 including a second drive pulley 74, and third and fourth belts 88, 90 cooperating with fifth and sixth transfer pulleys 92, 94 to drive a pulley 96 mounted with a third gear box 98 on the third deck 26 as shown in FIGS. 1, 2 and 8a. Since the transfer of power to each of the first and third decks 22, 26 is accomplished in substantially the same manner with similarly constructed structure, only that structure accomplishing that transfer and pertaining to the first and second decks 22, 24 will be discussed in detail. In the preferred embodiment, a pulley and belt arrangement for transferring power to the blades of the decks is envisioned as discussed above and hereafter. However, mechanisms including a chain and sprocket or other comparable arrangements are also contemplated.

Figure 4:
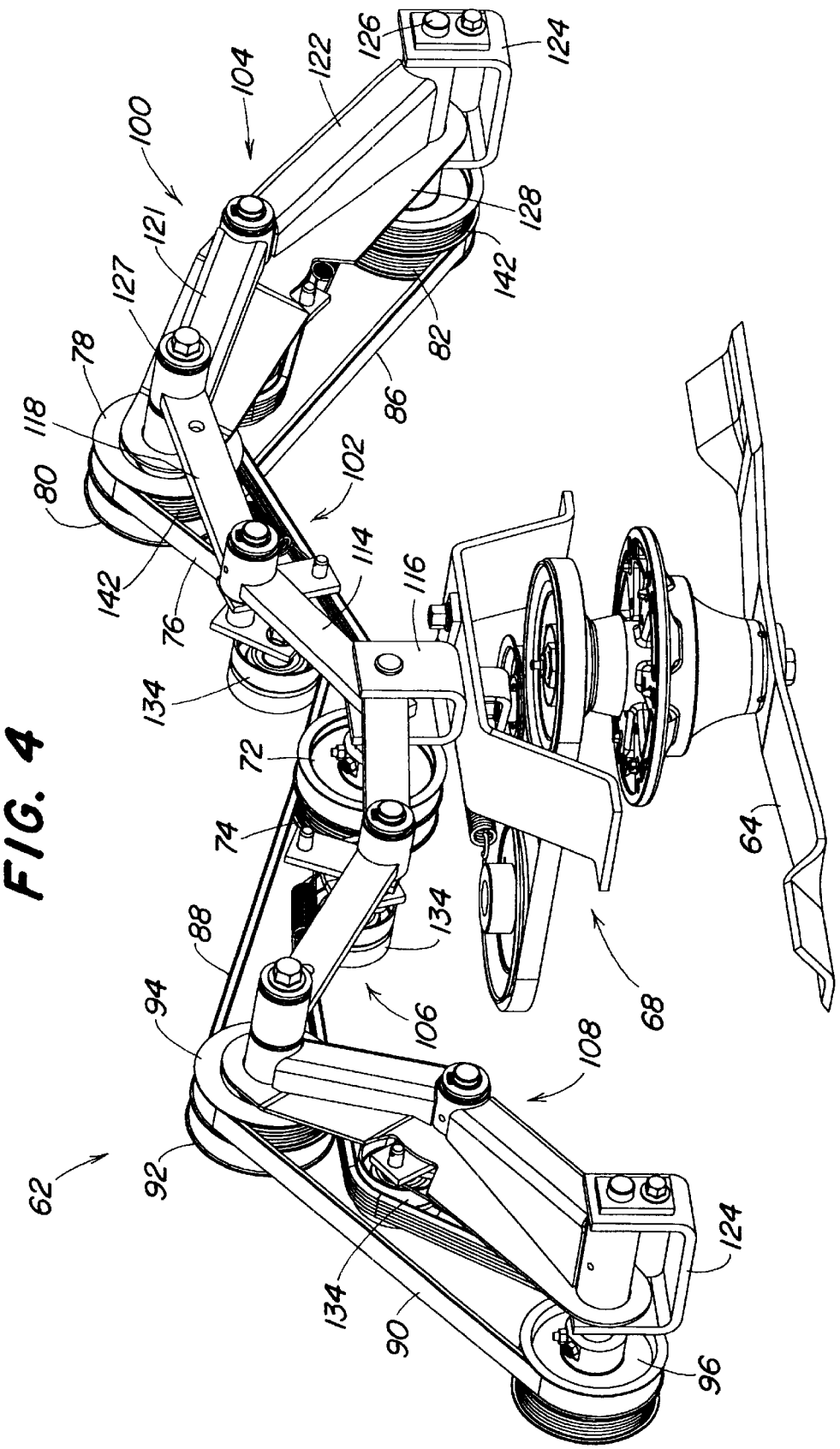
FIG. 4 is a front and side perspective schematic view of the belt drive and support arrangement according to FIG. 1.

As can be seen best in FIG. 4, the drive 62 includes a pivot arm support arrangement 100 including first and second arms 102, 104, and third and fourth arms 106, 108 which carry the third and fourth, and fifth and sixth transfer pulleys 78 and 80, and 92 and 94 respectively, above the pivotal connection of the first and third decks 22, 26. With regard to the first and second decks 22, 24, the arrangement 100 includes the first arm 102 constructed of fixed length and having a first end 114 pivotally attached to a bracket 116 mounted with the second or central deck 24. The second end 118 of the first arm 102 is pivotally attached to the second arm 104, also of fixed length, at an end 121. The remaining end 122 of the second arm 104 is pivotally attached to a bracket 124 welded to the top surface of the first deck 22. This remaining end 122 is rotatably mounted on a shaft 126, shown in FIG. 4, which extends through the bracket 124 and is mounted thereto.

The third and fourth pulleys 78, 80 responsible for transferring power from the PTO to the gear box 84 on the first deck 22 are supported at the ends 118 and 121 of the first and second arms 102, 104 respectively. More particularly and as shown in FIG. 4, each of the pulleys 78, 80 is mounted on a shaft 127 extending through and carried by the ends 118 and 121. These pulleys 78 and 80 are fixed together to rotate in unison. So too, are pulleys 92, 94 fixed together.

With each of the arms 102 and 104 being pivotally connected at shaft 127, they may also be said to comprise one elongated member. This elongated member, as shown particularly in FIG. 4, further carries the means by which power is transferred by a delivery source such as the PTO to the blades of the side deck 22, including transfer pulleys 78 and 80 carried at the mid-section of the member and belts 76 and 86 operating thereon.

Figure 5:
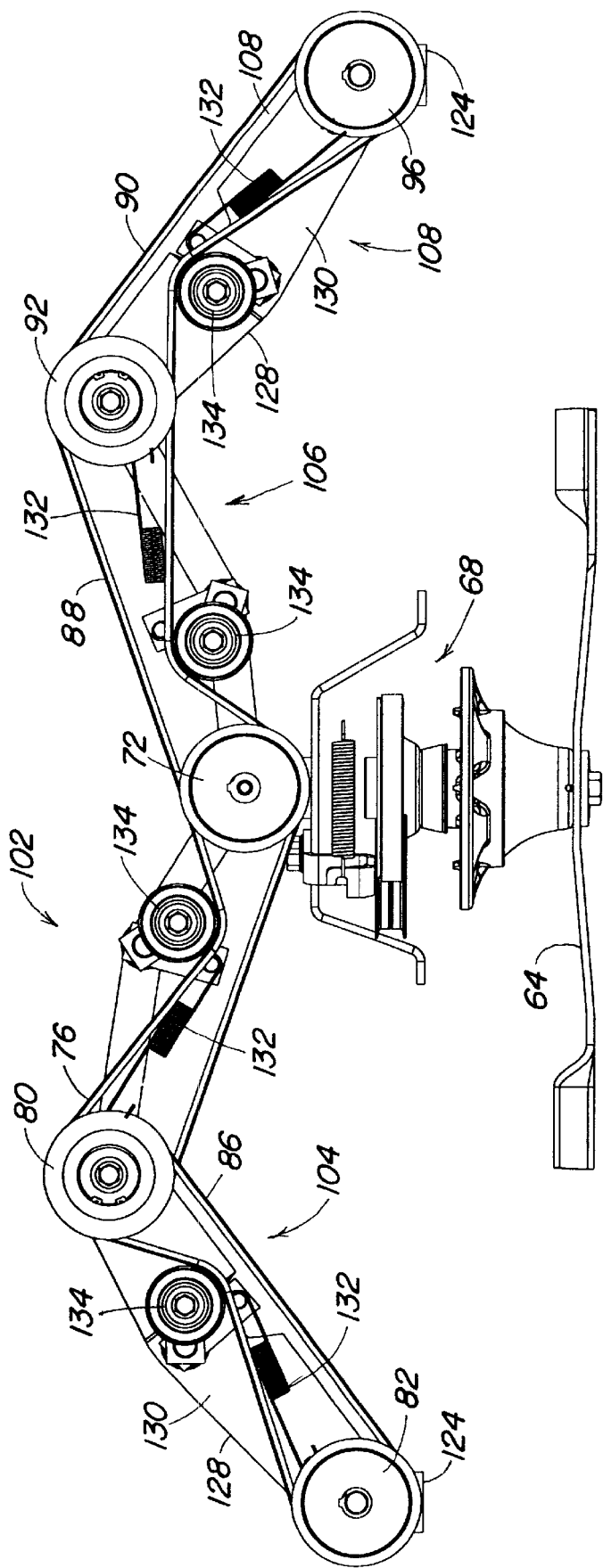
FIG. 5 is a rear schematic view of the belt drive when the implement is positioned on an even ground surface.
Figure 6:
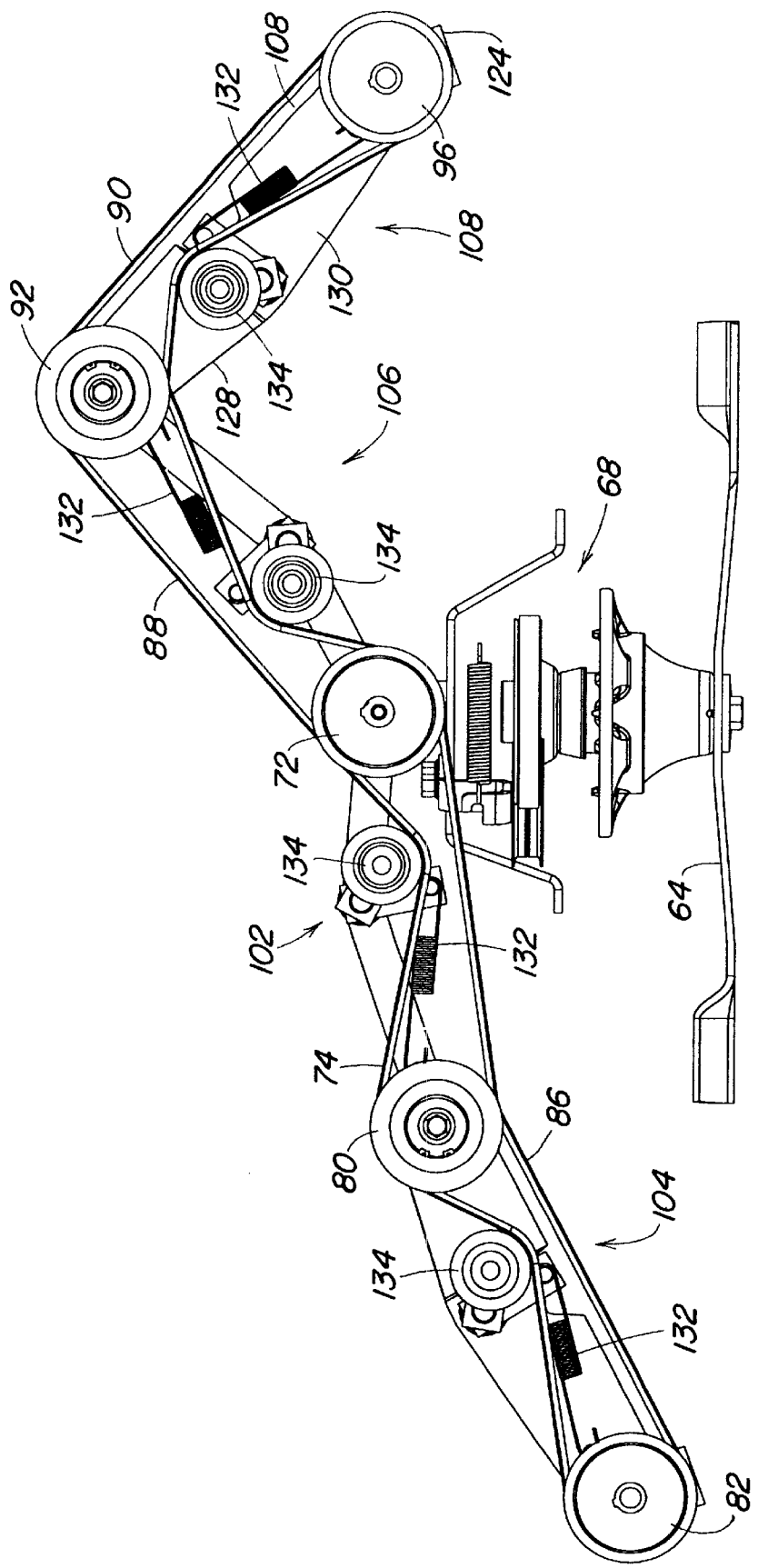
FIG. 6 is a rear schematic view of the belt drive when the implement is positioned on an uneven ground surface and one of the decks thereof is pivoted upwardly.
Figure 7:
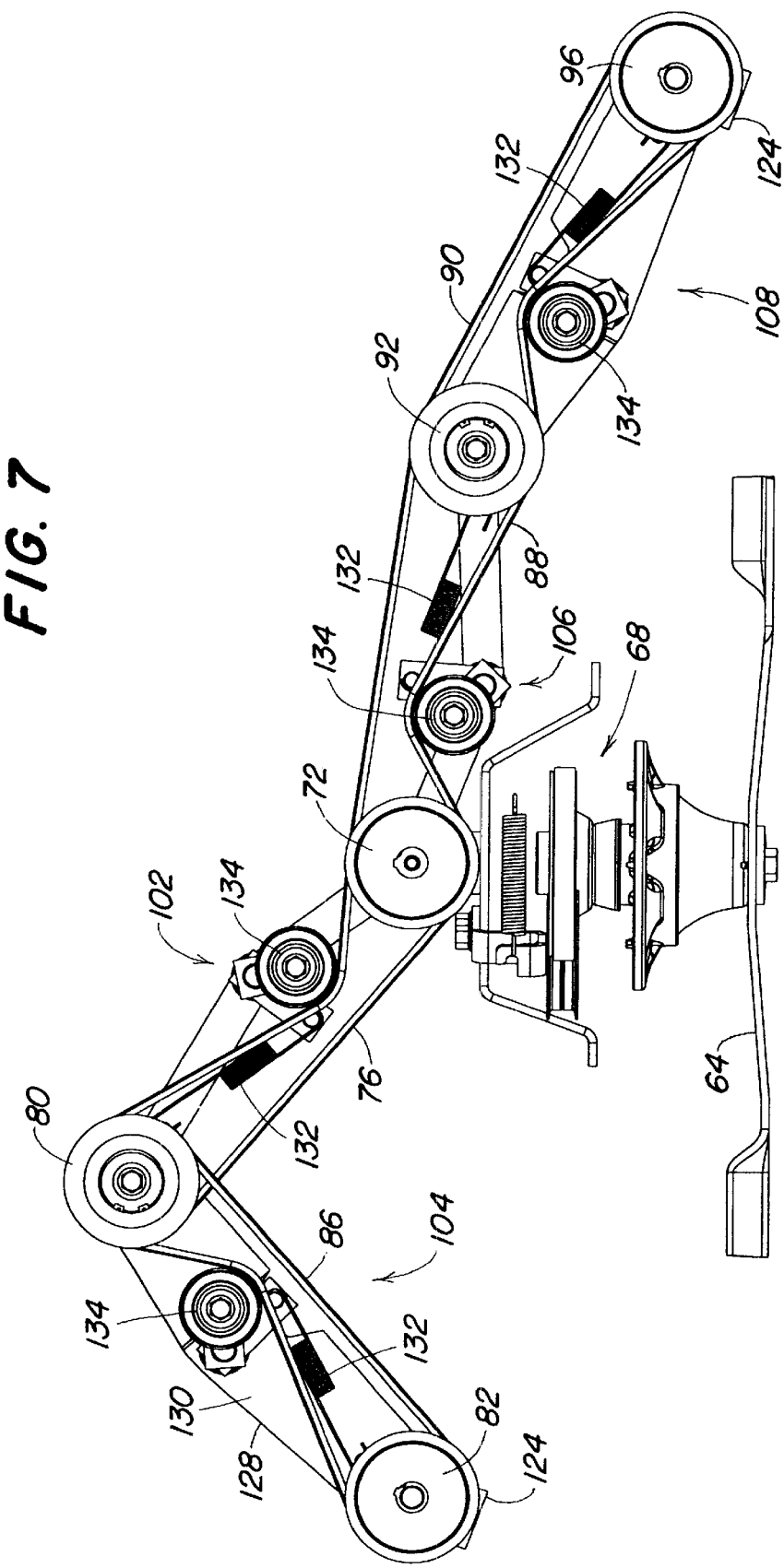
FIG. 7 is a rear schematic view of the belt drive when the implement is positioned on an uneven ground surface and the other of the decks is pivoted upwardly.

To guard against a disruption in the belts' operation when either the first or third decks 22, 26 raise and come into contact with low lying shrubbery etc., arms 104 and 108, as seen in FIG. 4, are surrounded by metal plating 128. If preferred, the drives and belts can be housed within a covered enclosure to prevent entry of branches and/or other material into the belts and/or pulleys. On a backside 130 of the plate 128 shown in FIGS. 5–7, idler pulleys 132 are attached thereto which engage the first and second belts 76, 86 to maintain tension thereon. Further provided are springs 134 connected on the arms 102, 104, as seen in FIGS. 5 and 6, to provide and maintain sufficient force on the idler pulleys 132 so as to properly tension the belts 78, 86.

FIGS. 8 and 8a most simply illustrate the arm arrangement 100 of the present invention which enables the belts 76, 86 entrained about the pulleys 72, 78, 80 and 82 to straightly enter and exit with respect thereto upon pivoting of the deck 22 and relative to the second or central deck 24. Straight movement of the belts 76, 86 into and out of the pulleys 78, 80 is permitted by mounting the pulleys 78, 80 between the decks 22 and 24 and on the arms 102 and 104. As shown throughout FIGS. 6–7, the arms 102 and 104 pivot in response to movement of the implement 20 across an uneven ground surface to enable each of the pulleys 72, 78, 80, 82 to rotate about axes A, shown in FIG. 8a, that remain parallel as a particular deck pivots either upwardly or downwardly. With movement about the axes A as the deck 22 pivots, the belts 76 and 86 are permitted to stay aligned with the grooves 142 of the pulleys as shown in FIG. 4. Accordingly, each of the belts 76, 86 attached to the respective pulleys enters and exits smoothly and while remaining substantially independent of the amount of pivoting occurring between each of the adjacent decks.

Figure 9:
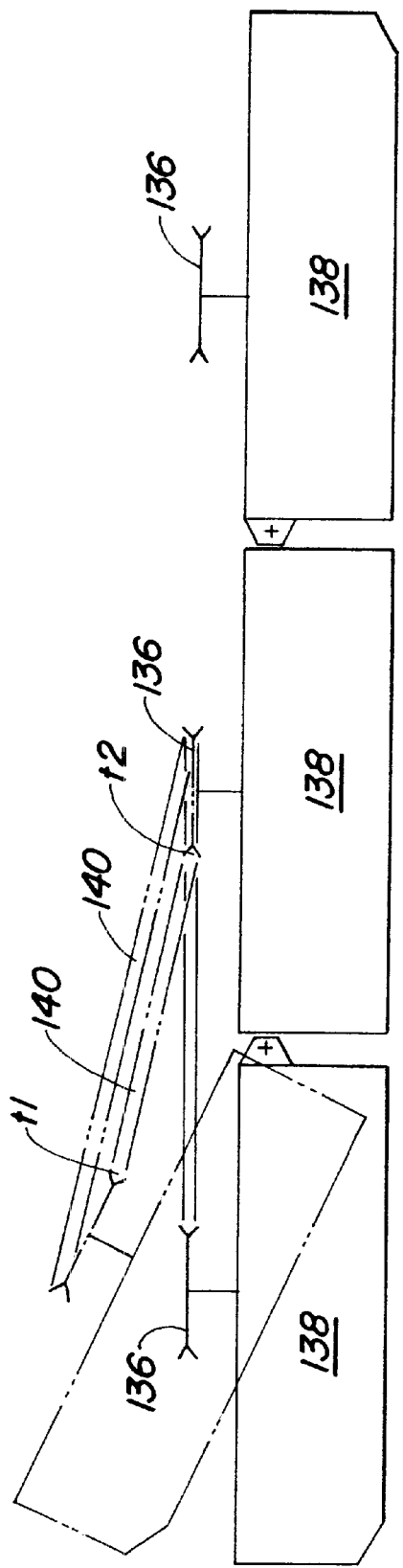
FIG. 9 is schematic and front view of a mower cutting implement and belt drive arrangement of the prior art illustrating the twisting that occurs among the belts of the drive when one deck pivots relative to its adjacent and pivotally connected deck.

In contrast, prior art belt drive designs have included mounting all of the pulleys 136 used therewith with a top surface of the adjoining decks 138 as shown in FIG. 9 so that the pulleys rotate within substantially horizontal planes. Mounting of this type has resulted in the belts 140 entrained on the pulleys 136 twisting and turning as they enter and exit those pulleys, see FIG. 9 at $t_1$ and $t_2$.

Additionally, since each of the first and second arms 102, 104 are of substantially fixed and equal length, the distance between each of the pulleys 72 and 78, and 80 and 82, respectively, is substantially the same. Therefore, the axis of rotation for the pulleys 78, 80 remains substantially above the pivot axis between the adjacent decks 22, 24. An additional benefit of the two arm having pivotal interconnection is that the belts 76 and 86 entrained about the pulleys maintain their original length resulting in more dependable operation of the implement since the belts are unlikely to slip within the grooves 142 of the pulleys. While the preferred embodiment contemplates the use of first and second arms of substantially equal length, they could also differ in length as the adjacent deck sizes and configurations are varied.

While the present invention has been described in conjunction with a specific embodiment, it is understood that many alternatives, modifications, and variations will be apparent to those skilled in the art in light of the foregoing description. Accordingly, this invention is intended to embrace all such alternatives, modifications and variations which fall within the spirit and scope of the appended claims.

I claim:

1. A cutting implement comprising:
   a) a plurality of pivotally connected adjacent cutting decks supported upon ground engaging wheels, the adjacent decks having a pivotal connection that has a generally fore and aft extending axis, each of the decks further housing a cutting blade therewithin;
   b) a plurality of gear boxes, each being mounted to a respective cutting deck and operatively connected with the blade therein to turn it;
   c) first and second pulleys respectively carried by the gear boxes on adjacent decks to rotate about respective axes that are substantially parallel to the axis of the pivotal connection;
   d) first and second interconnected pivot arms secured to and carried respectively on adjacent decks and extending upwardly to adjacent end portions located substantially above the pivotal connection of the decks;
   e) third and fourth pulleys supported by the adjacent end portions for rotation about an axis substantially parallel to the axis of the pivotal connection and the axis of rotation of the first and second pulleys, the third and fourth pulleys adapted to rotate together; and,
   f) a first belt entrained about the first and third pulley to rotate the third pulley and a second belt entrained about the fourth and second pulley to rotate the second pulley and thereby drive the blade housed within the respective deck.

2. The cutting implement as recited in claim 1, wherein: each of the arms carries a spring-loaded tensioning pulley between the first and second pulleys and respective end portions of the first and second pivot arms which engage each of the belts.

3. The cutting implement as recited in claim 1, wherein: the first and second pivot arms are not equal in length.

4. The cutting implement as recited in claim 1, wherein: the first and second pivot arms are of substantially equal length so as to provide a substantially equal distance between the pair of the first and third pulleys and the pair of the second and fourth pulleys.

5. The cutting implement as recited in claim 1, wherein: the third and fourth pulley remain aligned above the pivotal connection.

6. A cutting implement comprising:
   a) first and second pivotally connected decks supported upon ground engaging wheels, the decks having a pivotal connection that has a generally fore and aft extending axis, each of the decks having a cutting blade associated therewith;
   b) a first and second gear box secured to the first and second decks, respectively, and operatively connected with the blade to turn it;
   c) first and second pulleys respectively carried by the gear boxes on adjacent decks to rotate about respective axes that are substantially parallel to the axis of the pivotal connection;
   d) first and second pivot arms each having a proximal end thereof attached to the first and second decks and a distal end at which each of the arms are interconnected, each arm maintaining a constant distance between the distal end and proximal end of the arm permitting a variable distance between respective proximal ends of each of the arms upon pivoting of the decks;

e) third and fourth pulleys carried by the distal ends to rotate about an axis substantially parallel to the axis of the pivotal connection and the axes of rotation of the first and second pulleys and vertically moved with the distal ends upon pivoting of at least one of the decks, the third and fourth pulleys adapted to rotate together; and, f) a first belt entrained about the first and third pulley to rotate the third pulley and a second belt entrained about the fourth and second pulley to rotate the second pulley and thereby drive the blade housed within the respective deck.

7. The cutting implement as recited in claim 6, wherein:
each of the arms carries a spring-loaded tensioning pulley between the first and second pulleys and respective end portions of the first and second pivot arms which engage each of the belts.

8. The cutting implement as recited in claim 6, wherein:
the first and second pivot arms are not equal in length.

9. The cutting implement as recited in claim 6, wherein:
the first and second pivot arms are of substantially equal length so as to provide a substantially equal distance between the pair of the first and third pulleys and the pair of the second and fourth pulleys.

10. The cutting implement as recited in claim 6, wherein:
the third and fourth pulley remain aligned above the pivotal connection.

\* \* \* \* \*